United States Patent
Yang (10) Patent No.: US 10,832,086 B2
(45) Date of Patent: Nov. 10, 2020

(54) TARGET OBJECT PRESENTATION METHOD AND APPARATUS

(71) Applicant: Tencent Technology (Shenzhen) Company Limited, Shenzhen (CN)

(72) Inventor: Ruoxu Yang, Shenzhen (CN)

(73) Assignee: TENCENT TECHNOLOGY (SHENZHEN) COMPANY LIMIITED, Shenzhen (CN)

(*) Notice: Subject to any disclaimer, the term of this patent is extended or adjusted under 35 U.S.C. 154(b) by 47 days.

(21) Appl. No.: 16/112,486

(22) Filed: Aug. 24, 2018

(65) Prior Publication Data

US 2018/0365518 A1    Dec. 20, 2018

Related U.S. Application Data (63) Continuation-in-part of application No. PCT/CN2017/077042, filed on Mar. 17, 2017.

(30) Foreign Application Priority Data

Mar. 29, 2016   (CN) .......................... 2016 1 0188631

(51) Int. Cl.
*G06K 9/62* (2006.01)
*A63F 13/00* (2014.01)
(Continued)

(52) U.S. Cl.
CPC ............ *G06K 9/6215* (2013.01); *A63F 13/00* (2013.01); *A63F 13/655* (2014.09); *A63F 13/69* (2014.09);
(Continued)

(58) Field of Classification Search
CPC ............ G06K 9/6215; G06K 9/00456; G06K 9/3241; A63F 13/655; A63F 13/69;
(Continued)

(56) References Cited

U.S. PATENT DOCUMENTS

2014/0241586 A1* 8/2014 Miyamoto ......... G06K 9/00442
                                                            382/106

FOREIGN PATENT DOCUMENTS

CN   103294918 A   9/2013
CN   103310099 A   9/2013
(Continued)

OTHER PUBLICATIONS

Tencent Technology, ISRWO, PCT/CN2017/077042, dated May 31, 2017, 7 pgs.

(Continued)

*Primary Examiner* — Marcos L Torres
(74) *Attorney, Agent, or Firm* — Morgan, Lewis & Bockius LLP (57) ABSTRACT

Embodiments of this application disclose a target object rendition method performed by an electronic device having a camera and a display screen. The electronic device photographs an entity card by using a camera. From the photograph, the electronic device obtains a to-be-recognized target object that is printed on the entity card and then image interpretation data of the to-be-recognized target object, the image interpretation data being used to reflect a feature of the to-be-recognized target object. After matching the image interpretation data with prestored image interpretation data, the electric device obtains a prestored target object corresponding to prestored image interpretation data matching the image interpretation data. Finally, the electronic device invokes an application (e.g., a computer game) associated with the prestored target object (e.g., a virtual character of the computer game) and renders, using the application, the prestored target object on the display screen.

4 Claims, 5 Drawing Sheets

(51) Int. Cl.
  *A63F 13/69*   (2014.01)
  *G06K 9/00*    (2006.01)
  *A63F 13/655*  (2014.01)
  *G06K 9/32*    (2006.01)
  *G06T 7/00*    (2017.01)
  *G06T 13/40*   (2011.01)
  *G06T 13/80*   (2011.01)
  *G06T 15/00*   (2011.01)

(52) U.S. Cl.
  CPC ....... *G06K 9/00456* (2013.01); *G06K 9/3241* (2013.01); *G06T 7/0002* (2013.01); *G06T 13/40* (2013.01); *G06T 13/80* (2013.01); *G06T 15/005* (2013.01)

(58) Field of Classification Search
  CPC ....... A63F 13/00; G06T 15/005; G06T 13/80; G06T 13/40; G06T 7/0002; G06T 2219/028; G06T 19/00; G06T 13/20; G06F 16/50
  See application file for complete search history.

(56) References Cited

FOREIGN PATENT DOCUMENTS

| | | |
|---|---|---|
| CN | 103929597 A | 7/2014 |
| CN | 104463055 A | 3/2015 |
| CN | 105260409 A | 1/2016 |
| CN | 105405168 A | 3/2016 |
| CN | 105869216 A | 8/2016 |
| KR | 20120010041 A | 2/2012 |
| KR | 20130056309 A | 5/2013 |

OTHER PUBLICATIONS

Tencent Technology, IPRP, PCT/CN2017/077042, daed Oct. 2, 2018, 6 pgs.

\* cited by examiner

TARGET OBJECT PRESENTATION METHOD AND APPARATUS

PRIORITY CLAIM AND RELATED APPLICATION

This application is a continuation-in-part application of PCT/CN2017/077042, entitled "TARGET OBJECT DISPLAYING METHOD AND DEVICE" filed on Mar. 17, 2017, which claims priority to Chinese Patent Application No. 201610188631.X, filed with the State Intellectual Property Office of the People's Republic of China on Mar. 29, 2016, and entitled "TARGET OBJECT PRESENTATION METHOD AND APPARATUS", all of which are incorporated herein by reference in their entirety.

This application is related to U.S. application Ser. No. 16/112,493, entitled "TARGET OBJECT DISPLAY METHOD AND APPARATUS" filed on Aug. 24, 2018, which is incorporated herein by reference in its entirety.

FIELD OF THE TECHNOLOGY

This application relates to the field of computer technologies, and in particular, to a target object rendition method and apparatus.

BACKGROUND OF THE DISCLOSURE

With the development of network technologies, target objects need to be presented in more scenarios, for example, a target object in a game, a personnel model in a personnel management system, and a traffic and road condition model in the field of transportation.

When there are multiple target objects in a background, and a user wants to view a target object provided by an application program, the user needs to open a corresponding window of the application program according to a starting manner of the application program, and enters a parameter related to the target object in the corresponding window. Then the application program obtains the corresponding target object by matching according to the parameter and presents the target object. The user needs to perform relatively complex operations to view a target object in the application program. Therefore, presentation efficiency is relatively low.

SUMMARY

To resolve a problem in related technologies that presentation efficiency is relatively low because a user needs to perform relatively complex operations to view a target object in an application program. Embodiments of this application provide a target object rendition method and apparatus. The technical solutions are as follows:

An embodiment of this application provides a target object rendition method, applied to an electronic device comprising a camera, a display screen, one or more processors and memory storing a plurality of programs to be executed by the one or more processors, the method comprising:

photographing an entity card by using the camera;

obtaining, from the photograph, a to-be-recognized target object that is printed on the entity card;

obtaining image interpretation data of the to-be-recognized target object, the image interpretation data being used to reflect a feature of the to-be-recognized target object;

matching the image interpretation data with prestored image interpretation data;

obtaining a prestored target object corresponding to prestored image interpretation data matching the image interpretation data; and invoking an application associated with the prestored target object and rendering, using the application, the prestored target object on the display screen.

An embodiment of this application provides an electronic device comprising a camera, a display screen, one or more processors, memory, and a plurality of programs stored in the memory that, when executed by the one or more processors, cause the electronic device to perform the aforementioned target object rendition method.

An embodiment of this application provides a non-transitory computer readable storage medium storing a plurality of programs that, when executed by an electronic device having a camera and a display screen, cause the electronic device to perform the aforementioned target object rendition method.

In the foregoing technical solutions provided in the embodiments of this application, a virtual target object corresponding to a to-be-recognized target object is obtained by obtaining the to-be-recognized target object printed on an entity card, and is presented on the display screen of the electronic device. The virtual target object can be automatically obtained only by focusing a visual angle of the camera on the to-be-recognized target object on the entity card, and presented, with no need to perform complex operations by a user. Therefore, the technical problem in the related technologies that presentation efficiency is relatively low because a user needs to perform relatively complex operations to view a target object in an application program is resolved. By means of the technical solutions provided in the embodiments of this application, operation complexity can be lowered, thereby improving presentation efficiency.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the technology may still derive other drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings. The "electronic device" mentioned in this specification may include a smartphone, a tablet computer, a smart television, an ebook reader, a multimedia player, a laptop portable computer, a desktop computer, and the like.

Figure 1:
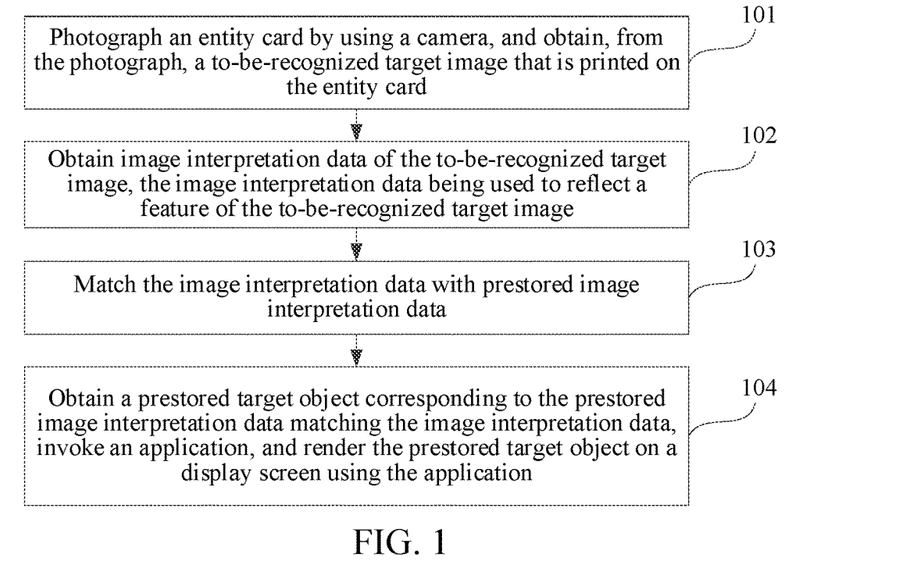
FIG. 1 is a flowchart of a target object rendition method according to an embodiment of this application.

Referring to FIG. 1, FIG. 1 is a flowchart of a target object rendition method according to an embodiment of this application. The method is applied to an electronic device including a camera and a display screen. The target object rendition method may include the following steps:

Step 101: Photograph an entity card by using the camera, to obtain a to-be-recognized target object that is printed on the entity card and that is photographed within a visual angle of the camera.

The entity card may be independent of the powered-on electronic device. Herein, the entity card may be a card made of a material such as paper or plastic.

The image printed on the card may be an image of a three-dimensional entity that is formed in a projection direction and that is printed on the card; or may be a virtual two-dimensional image printed on the card; or may be an image of a virtual three-dimensional model that is formed in a projection direction and that is printed on the card.

For example, a game company designs a three-dimensional hero model for a computer game, and releases images of the three-dimensional hero model that are formed in different projection directions and that are printed on cards to users. For another example, a real estate company releases images of a house entity that are obtained by photographing from different angles and that are printed on cards to user. Still for another example, an advertising company releases designed two-dimensional posters after printing the poster on cards. In some embodiments, the entity card includes multiple to-be-recognized target objects, each to-be-recognized target object corresponding to a respective virtual character of the computer game.

When the image on the card is photographed by the camera of the electronic device and needs to be recognized, the image on the card is referred to as a to-be-recognized target object.

Step 102: Obtain, from the photograph, image interpretation data of the to-be-recognized target object, the image interpretation data being used to reflect a feature of the to-be-recognized target object.

Generally, for a same three-dimensional model, multiple images are formed in different projection directions. Image interpretation data of the images is similar, that is, a difference value between image interpretation data of any two of the images is less than a preset difference threshold.

Step 103: Match the image interpretation data with prestored image interpretation data.

Step 104: Obtain a prestored target object corresponding to prestored image interpretation data matching the image interpretation data, invoke an application associated with the prestored target object and render the prestored target object on the display screen of the electronic device, e.g., the target object being a virtual two-dimensional model or a virtual three-dimensional model.

The target object is a virtual model (that is, the foregoing virtual two-dimensional image or virtual three-dimensional model) which is a basis for forming the image on the entity card, or is a virtual model corresponding to a three-dimensional entity which is a basis for forming the image on the entity card.

For example, when the image printed on the card is obtained by means of a three-dimensional entity, the target object is a virtual two-dimensional model or a virtual three-dimensional model corresponding to the three-dimensional entity; when the image printed on the card is obtained by means of a virtual two-dimensional image, the target object is the virtual two-dimensional image or a virtual three-dimensional model corresponding to the virtual two-dimensional image; and when the image printed on the card is obtained by means of a virtual three-dimensional model, the target object is the virtual three-dimensional model or a virtual two-dimensional image of the virtual three-dimensional model that is formed in a preset projection direction.

Using the entity card including multiple virtual characters of a computer game as an example, the electronic device first captures a photograph of the entity card including the multiple virtual characters. Next, the electronic device identifies one of the multiple virtual characters as a to-be-recognized target object and then compares the to-be-recognized target object with the prestored image interpretation data. If there is a match between the two sides, the electronic device may submit a request to a remote server through the Internet for associating the electronic device or a user account associated with the electronic device with the corresponding virtual character represented by the to-be-recognized target object. When there are multiple users each attempting to associate their respective electronic devices with one of the virtual characters, the server may establish the correspondence relationship on a first-come-first-serve basis. As such, it is possible that the request may be denied by the server if the corresponding virtual character has been associated with and therefore reserved by another electronic device. In this case, the electronic device may have to perform the aforementioned matching process repeatedly until a match is found and a correspondence relationship is then established between the two sides.

In some embodiments, the process depicted in FIG. 1 is performed automatically without any further user intervention and the user merely needs to point the electronic device (more specifically the camera) at the entity card until one of the to-be-recognized target object is recognized and the corresponding application (e.g., the computer game) is invoked to render the corresponding prestored target object on the display screen. Sometimes the display screen may keep the real-time actual background photograph captured by the camera on the display screen along with the prestored target object rendered by the application to further enhance the augmented reality of the application.

In conclusion, in the target object rendition method provided in this embodiment, the virtual target object corresponding to the to-be-recognized target object is obtained by obtaining the to-be-recognized target object printed on the entity card, and is presented on the display screen of the electronic device. The virtual target object can be automatically obtained only by focusing a visual angle of the camera on the to-be-recognized target object on the entity card, and presented, with no need to perform complex operations by a user. Therefore, the technical problem in the related technologies that presentation efficiency is relatively low because a user needs to perform relatively complex operations to view a target object in an application program is resolved. By means of the target object rendition method provided in this embodiment of this application, operation complexity can be lowered, thereby improving presentation efficiency.

Figure 2A:
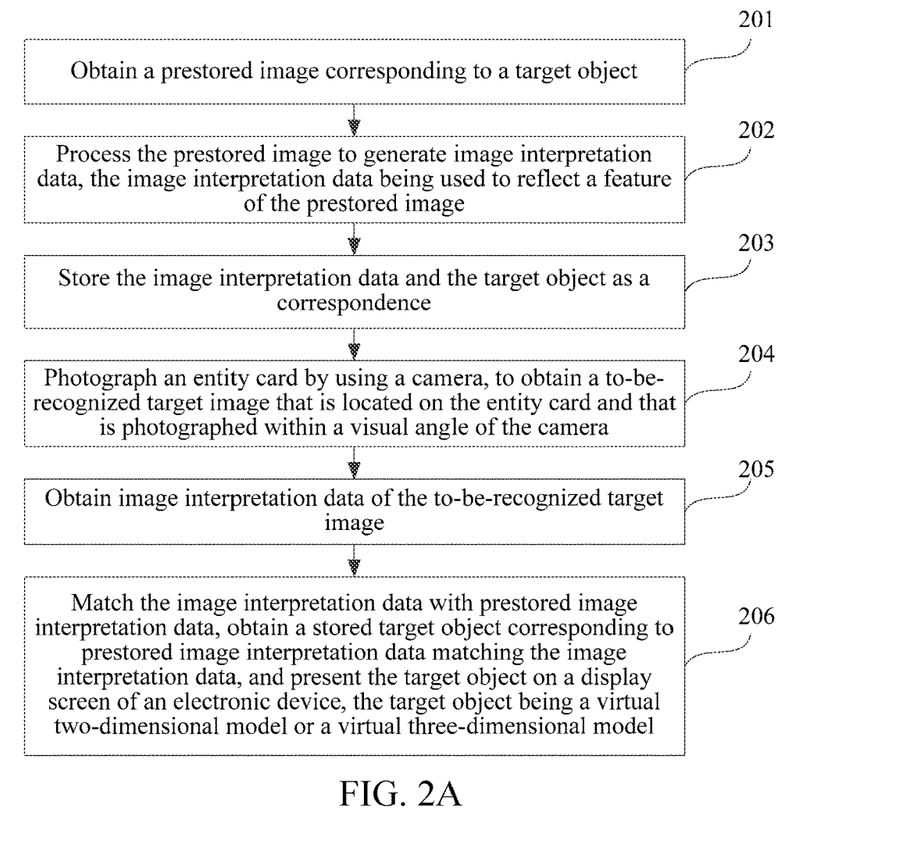
FIG. 2A is a flowchart of a target object rendition method according to another embodiment of this application.

Referring to FIG. 2A, FIG. 2A is a flowchart of a target object rendition method according to another embodiment of this application. The method is applied to an electronic device including a camera and a display screen. The target object rendition method may include the following steps:

Step 201: Obtain a prestored image corresponding to a target object.

The target object is a virtual two-dimensional model or a virtual three-dimensional model. In this embodiment of this application, the target object may be a static virtual model, or may be a dynamic virtual model. The virtual model may be understood as: a virtual model can be need displayed only by using a powered-on electronic device, for example, the target object is displayed on a display screen of the powered-on electronic device, or a two-dimensional or three-dimensional projection of the target object is displayed by using a projection function of the powered-on electronic device.

If the target object is a static virtual model, the prestored image corresponding to the target object may be determined by using the following two manners according to a type of the target object:

In a first implementation, when the target object is a virtual two-dimensional model, the prestored image corresponding to the target object is an image corresponding to the two-dimensional model;

In a second implementation, when the target object is a virtual three-dimensional model, the prestored image corresponding to the target object is an image of the three-dimensional model that is formed in a preset projection direction. Apparently, the prestored image corresponding to the target object is an electronic image.

For example, the target object is a virtual three-dimensional sofa model. System development personnel may use an electronic image such as a side view, a main view, a rear view, or a planar view of the virtual three-dimensional sofa model as a prestored image of the virtual three-dimensional sofa model.

In this embodiment of this application, some elements of the target object may be changed. In this case, the prestored image corresponding to the target object may be determined according to the target object of which the elements are changed. Refer to the foregoing two implementations for an implementation of determining the prestored image corresponding to the target object, and details are not described herein again.

For example, the target object may be a virtual character (for example, a combat hero). Game developers may use electronic images of different images of a virtual character as prestored images of the virtual character. Herein, the different images may be of the virtual character in different costume (that is, changing a costume element). Electronic images such as projection images of the virtual character from different viewing angles may alternatively be used as prestored images of the virtual character.

If the target object is a dynamic virtual model, when a prestored image corresponding to the target object needs to be obtained, any image frame or any key image frame in image frames presented by the dynamic virtual model may be used as the prestored image of the target object.

In an actual design, a prestored image is preset by the system development personnel, and a correspondence between a target object and the prestored image is also set by the system development personnel. For example, if the target object is a virtual hero of a game, the system development personnel may select multiple prestored images to correspond to the virtual hero. In this embodiment, a manner of setting a correspondence between a target object and a prestored image is not specifically limited, and may be selected according to actual needs.

During actual implementation, a prestored image may be directly printed or recorded on an entity card, so that the entity card may be subsequently photographed in real time by using the camera of the electronic device, to obtain the image printed on the card.

Step 202: Process the prestored image to generate image interpretation data, the image interpretation data being used to reflect a feature of the prestored image.

In this embodiment of this application, the electronic device may upload a prestored image to a software development kit, for example, an augmented reality software (for example, Vuforia) development kit, to generate image interpretation data of the prestored image. The image interpretation data is used to reflect a feature of the prestored image, for example, to reflect at least one of a pixel, a color, a grayscale value, and the like of the prestored image. When similarity between two pieces of image interpretation data is higher, it indicates that similarity between two images corresponding to the two pieces of image interpretation data is higher. When two pieces of image interpretation data are completely the same, it indicates that the images corresponding to the two pieces of image interpretation data are the same.

Step 203: Store the image interpretation data and the target object as a correspondence.

In an implementation, after image interpretation data is obtained, a target object corresponding to a prestored image is obtained, and then the image interpretation data and the target object are stored as a correspondence.

In another implementation, image interpretation data and a target object may be stored as a correspondence according to a matching instruction delivered by the system development personnel.

Using that a target object is a virtual sofa model, and a main view of the sofa model is a prestored image as an example, the system development personnel store image interpretation data of the main view of the sofa model and the virtual sofa model as a correspondence.

The system development personnel extract correspondence between the image interpretation data and the target object, so that in step 205 and step 206, the electronic device or server determines a target object corresponding to a to-be-recognized image according to interpretation data of the to-be-recognized image.

Step 204: Photograph an entity card by using the camera, to obtain a to-be-recognized target object that is located on the entity card and that is photographed within a visual angle of the camera.

For example, if the entity card is used as a to-be-recognized target, when a user focuses a visual angle of the camera of the electronic device on the entity card, the electronic device obtains a to-be-recognized target object printed on the entity card. In this embodiment of this application, after an image is photographed by the camera, the electronic device performs foreground recognition on the image, to obtain the to-be-recognized target object. In this embodiment, a pixel corresponding to the to-be-recognized target object is a foreground of the image.

Step 205: Obtain image interpretation data of the to-be-recognized target object.

Generally, the electronic device may upload the to-be-recognized target object to the server, and the server generates image interpretation data according to the to-be-recognized target object, so that the server can search a database for image interpretation data matching the generated image interpretation data.

In this embodiment of this application, the electronic device directly generates image interpretation data according to the to-be-recognized target object, and sends the image interpretation data to the server, so that the server can search a database for image interpretation data matching the receives image interpretation data.

In this embodiment of this application, the electronic device generates interpretation data according to the to-be-recognized target object, and searches a local database for image interpretation data matching the generated image interpretation data.

Refer to step 202 for a manner of generating image interpretation data of a target object.

Step 206: Match the image interpretation data with prestored image interpretation data, obtain a prestored target object corresponding to prestored image interpretation data matching the image interpretation data, and render the prestored target object on the display screen of the electronic device, the target object being a virtual two-dimensional model or a virtual three-dimensional model.

Figure 2B:
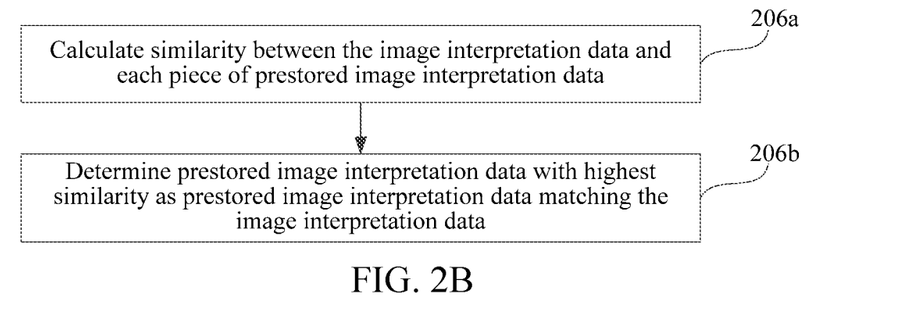
FIG. 2B is a flowchart of a method for matching image interpretation data with prestored image interpretation data according to an embodiment of this application.

Specifically, in this step, the matching the image interpretation data with prestored image interpretation data may be implemented by performing several substeps shown in FIG. 2B. FIG. 2B is a flowchart of a method for matching the image interpretation data with prestored image interpretation data according to an embodiment of this application.

Step 206a: Calculate similarity between the image interpretation data and each piece of prestored image interpretation data.

Step 206b: Determine prestored image interpretation data with highest similarity as prestored image interpretation data matching the image interpretation data.

In this embodiment of this application, to improve accuracy of matching the image interpretation data with prestored image interpretation data, prestored image interpretation data with similarity greater than a preset threshold is determined as prestored image interpretation data matching the image interpretation data.

In addition, when the server searches for image interpretation data matching the generated image interpretation data, the server determines, according to a correspondence between prestored image interpretation data and a target object, a target object that is stored in the server and that is corresponding to prestored image interpretation data matching the image interpretation data, and sends the target object to the electronic device. The electronic device receives the to-be-recognized object, and presents the target object on the display screen of the electronic device.

In this embodiment of this application, when the electronic device searches a local database for image interpretation data matching the generated image interpretation data, the electronic device determines, according to the correspondence between a prestored image interpretation data and a target object, a target object that is locally stored and that is corresponding to prestored image interpretation data matching the image interpretation data, and presents the target object on the display screen of the electronic device.

For example, a user needs to present a virtual three-dimensional sofa model on the electronic device. When determining a prestored image corresponding to the virtual three-dimensional sofa model, the system development personnel use a main view of the three-dimensional sofa entity, store a correspondence between the prestored image and the virtual three-dimensional sofa model, and print the prestored image on an entity card. The electronic device also stores a correspondence between image interpretation data of the main view of the three-dimensional sofa entity and the virtual three-dimensional sofa model.

When wanting to present the sofa model on the electronic device, the user may focus the camera of the electronic device on the entity card, and after searching and matching in a database, the virtual three-dimensional sofa model is finally presented on the electronic device.

For another example, when selecting a hero in a game, a user may focus the camera of the electronic device on a hero card, to obtain a to-be-recognized target object on the hero card and image interpretation data of the to-be-recognized image. The server searches a database for prestored image interpretation data matching the image interpretation data of the to-be-recognized image, determines a prestored target object corresponding to the prestored image interpretation data matching the image interpretation data, and sends the target object to the electronic device, that is, sends a virtual hero corresponding to the hero card to the electronic device, and the electronic device presents the virtual hero.

In conclusion, in the target object rendition method provided in this embodiment, the virtual target object corresponding to the to-be-recognized target object is obtained by obtaining the to-be-recognized target object printed on the entity card, and is presented on the display screen of the electronic device. The virtual target object can be automatically obtained only by focusing a visual angle of the camera on the to-be-recognized target object on the entity card, and presented, with no need to perform complex operations by a user. Therefore, the technical problem in the related technologies that presentation efficiency is relatively low because a user needs to perform relatively complex operations to view a target object in an application program is resolved. By means of the target object rendition method provided in this embodiment of this application, operation complexity can be lowered, thereby improving presentation efficiency.

Figure 3A:
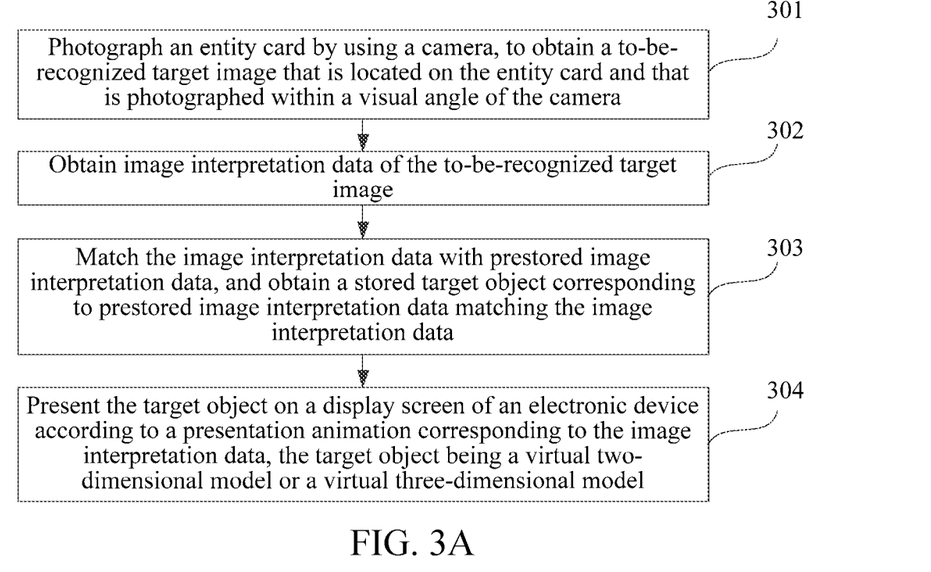
FIG. 3A is a flowchart of a target object rendition method according to another embodiment of this application.

Referring to FIG. 3A, FIG. 3A is a flowchart of a target object rendition method according to another embodiment of this application. The method is applied to an electronic device including a camera and a display screen. The target object rendition method may include the following steps:

Step 301: Photograph an entity card by using the camera, to obtain a to-be-recognized target object that is located on the entity card and that is photographed within a visual angle of the camera.

Step 302: Obtain image interpretation data of the to-be-recognized target object.

Step 303: Match the image interpretation data with prestored image interpretation data, and obtain a prestored target object corresponding to prestored image interpretation data matching the image interpretation data.

Step 301 to step 303 may respectively correspond to explanations in step 204 to step 206 shown in FIG. 2A. Details are not described again in this embodiment.

Step 304: Present the target object on the display screen of the electronic device according to an animated rendition corresponding to the image interpretation data, the target object being a virtual two-dimensional model or a virtual three-dimensional model.

System development personnel may also set the animated rendition played during presentation of the target object. That is, the system development personnel stores each piece of image interpretation data, a target object corresponding to the image interpretation data, and an animated rendition corresponding to the image interpretation data as a correspondence.

Because there is a correspondence between image interpretation data and an animated rendition, when presenting the target object, the electronic device obtains an animated rendition corresponding to image interpretation data, and presents the target object according to the animated rendition.

In conclusion, in the target object rendition method provided in this embodiment, the virtual target object corresponding to the to-be-recognized target object is obtained by obtaining the to-be-recognized target object printed on the entity card, and is presented on the display screen of the electronic device. The virtual target object can be automatically obtained only by focusing a visual angle of the camera on the to-be-recognized target object on the entity card, and presented, with no need to perform complex operations by a user. Therefore, the technical problem in the related technologies that presentation efficiency is relatively low because a user needs to perform relatively complex operations to view a target object in an application program is resolved. By means of the target object rendition method provided in this embodiment of this application, operation complexity can be lowered, thereby improving presentation efficiency.

Figure 3B:
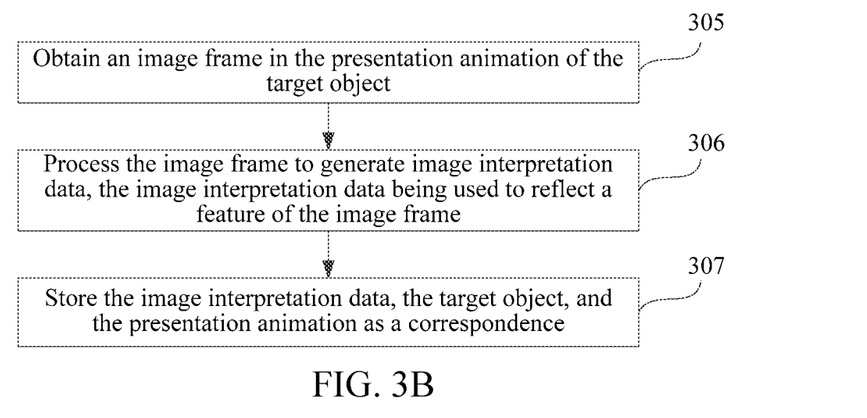
FIG. 3B is a flowchart of a method for using an image frame of an animated rendition as a prestored image according to an embodiment of this application.

To increase a correlation between an animated rendition and a prestored image, generally, an image frame in the animated rendition is used as the prestored image. Specifically, referring to several steps shown in FIG. 3B, FIG. 3B is a flowchart of a method for using an image frame of the animated rendition as prestored image according to an embodiment of this application.

Step 305: Obtain an image frame in the animated rendition of the target object.

During presentation, a same target object may be presented by using multiple animated renditions. For example, when a user selects a hero in a game for presentation, the hero may be presented by using a hero jumping animation, or by using a hero running animation.

The system development personnel may use an image frame of the hero jumping animation as a prestored image, so that after a user focuses the camera of the electronic device on an entity card corresponding to the prestored image, after searching and matching in a database, the hero is finally presented on the electronic device by using the hero jumping animation. The system development personnel may alternatively use an image frame of the hero running animation as a prestored image. Herein, a pixel corresponding to a target object is used as a foreground for each frame in the image frames. In this embodiment of this application, in the image frame, a foreground region is larger than a background region; or in the image frame, grayscale values of pixels in a background region are all (255, 255), that is, the background region in the image frame is white.

Step 306: Process the image frame to generate image interpretation data, the image interpretation data being used to reflect a feature of the image frame.

Specifically, the electronic device may upload a prestored image to a software development kit, for example, an augmented reality software (for example, Vuforia) development kit, to generate image interpretation data of the prestored image. The image interpretation data is used to reflect a feature of the prestored image. When similarity between two pieces of image interpretation data is higher, it indicates that similarity between two images corresponding to the two pieces of image interpretation data is higher. When two pieces of image interpretation data are completely the same, it indicates that the images corresponding to the two pieces of image interpretation data are completely the same.

Step 307: Store the image interpretation data, the target object, and the animated rendition as a correspondence.

Generally, the system development personnel sets a correspondence between image interpretation data, a target object, and an animated rendition. A system stores each image interpretation data, a target object corresponding to the image interpretation data, and an animated rendition corresponding to the image interpretation data as a correspondence in a database, so that in step 303 and step 304, the electronic device can present a target object according to image interpretation data and an animated rendition corresponding to the image interpretation data.

For example, the development personnel use an image frame of the hero jumping animation as a prestored image, print the image frame on a hero card, and store a correspondence between image interpretation data of the image frame, the hero, and the hero jumping animation in the server, So that, when a user focuses the camera of the electronic device on the hero card, the electronic device performs searching and matching in data, finally the electronic device presents the hero on the display screen by using a hero jumping animation.

Figure 4:
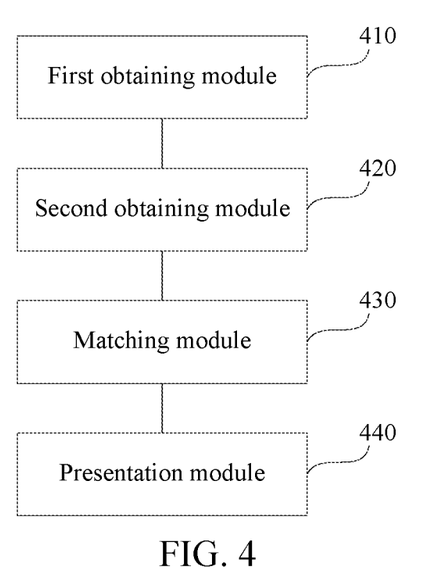
FIG. 4 is a schematic structural diagram of a target object presentation apparatus according to an embodiment of this application.

Referring to FIG. 4, FIG. 4 is a schematic structural diagram of a target object presentation apparatus according to an embodiment of this application. The target object presentation apparatus is applied to an electronic device including a camera and a display screen. The target object presentation apparatus may include: a first obtaining module 410, a second obtaining module 420, a matching module 430, and a presentation module 440.

The first obtaining module 410 is configured to photograph an entity card by using the camera, to obtain a to-be-recognized target object that is printed on the entity card and that is photographed within a visual angle of the camera.

The second obtaining module 420 is configured to obtain image interpretation data of the to-be-recognized target object obtained by the first obtaining module 410, the image interpretation data being used to reflect a feature of the to-be-recognized target object obtained by the first obtaining module 410.

The matching module 430 is configured to match the image interpretation data obtained by the second obtaining module 420 with prestored image interpretation data.

The presentation module 440 is configured to: obtain a prestored target object corresponding to prestored image interpretation data matching the image interpretation data, and render the prestored target object on the display screen, the target object being a virtual two-dimensional model or a virtual three-dimensional model.

In conclusion, in the target object presentation apparatus provided in this embodiment, the virtual target object corresponding to the to-be-recognized target object is obtained by obtaining the to-be-recognized target object printed on the entity card, and is presented on the display screen of the electronic device. The virtual target object can be automatically obtained only by focusing a visual angle of the camera on the to-be-recognized target object on the entity card, and presented, with no need to perform complex operations by a user. Therefore, the technical problem in the related technologies that presentation efficiency is relatively low because a user needs to perform relatively complex operations to view a target object in an application program is resolved. By means of the target object presentation apparatus provided in this embodiment of this application, operation complexity can be lowered, thereby improving presentation efficiency.

Figure 5:
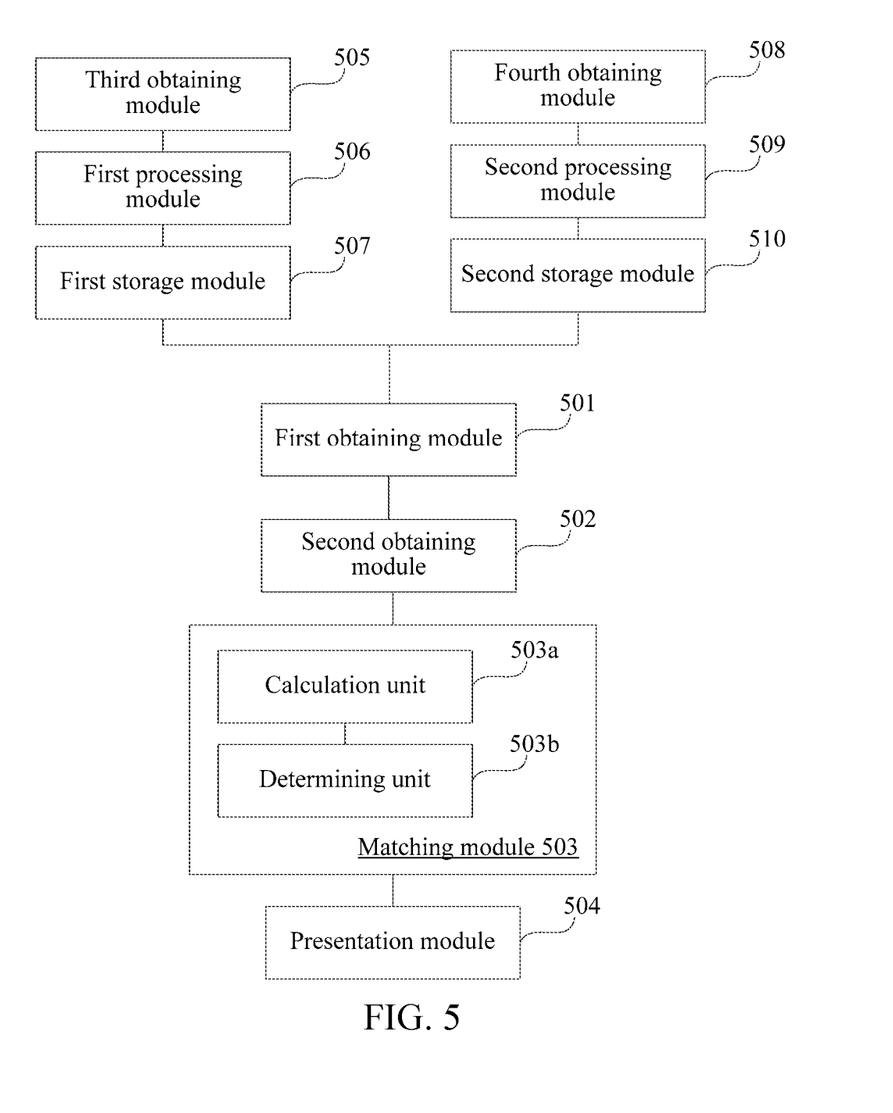
FIG. 5 is a schematic structural diagram of a target object presentation apparatus according to another embodiment of this application.

Referring to FIG. 5, FIG. 5 is a schematic structural diagram of a target object presentation apparatus according to another embodiment of this application. The target object presentation apparatus is applied to an electronic device including a camera and a display screen. The target object presentation apparatus may include: a first obtaining module 501, a second obtaining module 502, a matching module 503, and a presentation module 504.

The first obtaining module 501 is configured to photograph an entity card by using the camera, to obtain a to-be-recognized target object that is printed on the entity card and that is photographed within a visual angle of the camera.

The second obtaining module 502 is configured to obtain image interpretation data of the to-be-recognized target object obtained by the first obtaining module 501, the image interpretation data being used to reflect a feature of the to-be-recognized target object obtained by the first obtaining module 501.

The matching module 503 is configured to match the image interpretation data obtained by the second obtaining module 502 with prestored image interpretation data.

The presentation module 504 is configured to: obtain a prestored target object corresponding to prestored image interpretation data matching the image interpretation data, and render the prestored target object on the display screen, the target object being a virtual two-dimensional model or a virtual three-dimensional model.

In this embodiment of this application, the target object presentation apparatus may further include: a third obtaining module 505, a first processing module 506, and a first storage module 507.

The third obtaining module 505 is configured to obtain a prestored image corresponding to the target object.

The first processing module 506 is configured to process the prestored image obtained by the third obtaining module 505 to generate image interpretation data.

The first storage module 507 is configured to store the image interpretation data generated by first processing module 506 and the target object as a correspondence.

In this embodiment of this application, the target object presentation apparatus may further include: a fourth obtaining module 508, a second processing module 509, and a second storage module 510.

The fourth obtaining module 508 is configured to obtain an image frame in an animated rendition of the target object.

The second processing module 509 is configured to process the image frame obtained by the fourth obtaining module 508 to generate image interpretation data.

The second storage module 510 is configured to store the image interpretation data, the target object, and the animated rendition as a correspondence.

In this embodiment of this application, the presentation module 504 is further configured to present the target object according to the animated rendition corresponding to the target object on the display screen.

In this embodiment of this application, the matching module 503 further includes: a calculation unit 503a and a determining unit 503b.

The calculation unit 503a is configured to calculate similarity between the image interpretation data and each piece of prestored image interpretation data.

The determining unit 503b is configured to determine image interpretation data with highest similarity that is calculated by the calculation unit 503a as prestored image interpretation data matching the image interpretation data.

In conclusion, in the target object presentation apparatus provided in this embodiment, the virtual target object corresponding to the to-be-recognized target object is obtained by obtaining the to-be-recognized target object printed on the entity card, and is presented on the display screen of the electronic device. The virtual target object can be automatically obtained only by focusing a visual angle of the camera on the to-be-recognized target object on the entity card, and presented, with no need to perform complex operations by a user. Therefore, the technical problem in the related technologies that presentation efficiency is relatively low because a user needs to perform relatively complex operations to view a target object in an application program is resolved. By means of the target object rendition method provided in this embodiment of this application, operation complexity can be lowered, thereby improving presentation efficiency.

When the target object presentation apparatus provided in the foregoing embodiments presents a target object, description is made only through examples of division of the functional modules. In an actual application, the functions may be assigned according to needs to be implemented by different functional modules, that is, the internal structure of the electronic device is divided into different functional modules, so as to implement all or a part of the functions described above. In addition, an inventive concept of the target object presentation apparatus provided in the foregoing embodiments is the same as that of the target object rendition method embodiments. For a specific implementation process, refer to the method embodiments for details, and details are not described herein again.

Figure 6:
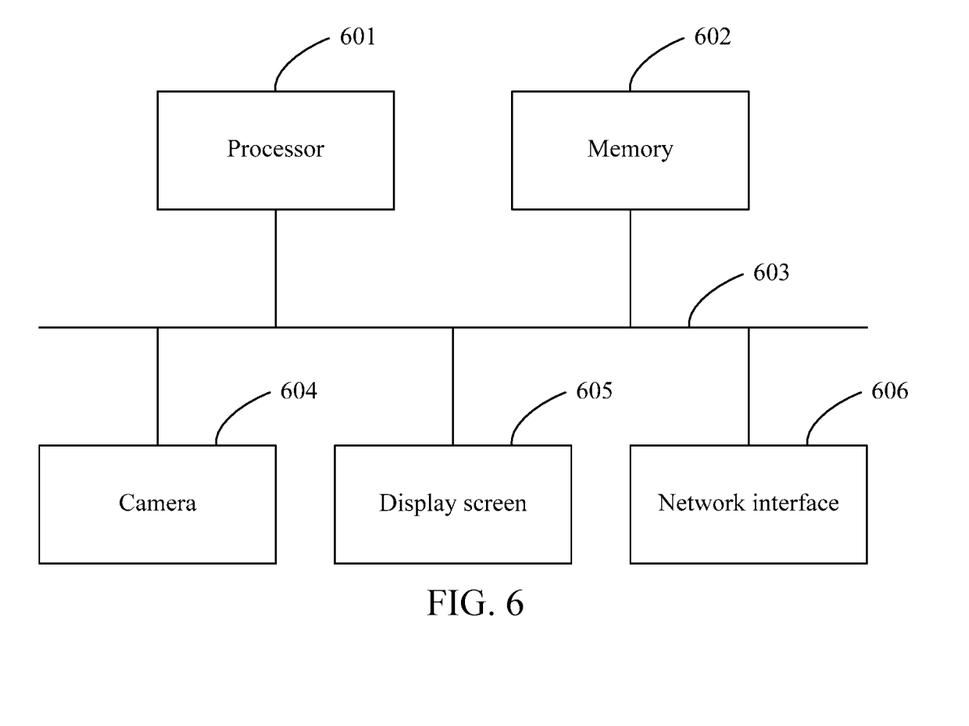
FIG. 6 is a schematic structural diagram of hardware of an electronic device for implementing a target object rendition method according to another embodiment of this application.

Referring to FIG. 6, FIG. 6 is a schematic structural diagram of hardware of an electronic device for implementing a target object rendition method according to another embodiment of this application.

As shown in FIG. 6, the electronic device includes a processor 601, a memory 602, a system bus 603, a camera 604, a display screen 605, and a network interface 606. Component including a memory 602 and a processor 601 are connected to the system bus 603. The processor 601 is hardware that performs computer programs and instructions by using basic arithmetic and logical operations in a computer system. The memory 602 is a physical device configured to temporarily or permanently store a computer program or data, for example, a volatile or non-volatile memory. The network interface 606 is configured to transmit data between the electronic device and a server or another device.

In this embodiment of this application, the processor 601 may communicate with the camera 604 by means of the system bus 603, to instruct the camera 604 to photograph an entity card. The processor 601 may also communicate with the memory 602 by means of the system bus 603, to perform computer readable instructions stored in the memory 602. The computer readable instructions include a first obtaining instruction, a second obtaining instruction, a matching instruction, and a presentation instruction. The processor 601 may also communicate with the display screen 605 by means of the system bus 603, to instruct the display screen 605 to present a target object.

In this embodiment of this application, the processor 601 is configured to read the first obtaining instruction, the second obtaining instruction, the matching instruction, and the presentation instruction stored in the memory 602, to perform the steps of the target object rendition method shown in FIG. 1 and functions of modules in the target object presentation apparatus shown in FIG. 4.

Further, the computer readable instructions further include a third obtaining instruction, a first processing instruction, and a first storage instruction that can be performed by the processor 601. The processor 601 is configured to read the foregoing instructions stored in the memory 602, to perform steps 201 to 203 in the target object rendition method shown in FIG. 2A and functions of the third obtaining module 505, the first processing module 506, and the first storage module 507 in the target object presentation apparatus shown in FIG. 5.

Further, the computer readable instructions further include a fourth obtaining instruction, a second processing instruction, and a second storage instruction that can be performed by the processor 601. The processor 601 is configured to read the foregoing instructions stored in the memory 602, to perform the steps in the method for using an image frame of the animated rendition as a prestored image shown in FIG. 3B and functions of the fourth obtaining module 508, the second processing module 509, and the second storage module 510 in the target object presentation apparatus shown in FIG. 5.

The sequence numbers of the preceding embodiments of this application are merely for description purpose but do not indicate the preference of the embodiments.

A person of ordinary skill in the technology may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of this application, but are not intended to limit this application. Any modification, equivalent replacement, and improvement made without departing from the spirit and principle of the present invention shall fall within the protection scope of this application.

What is claimed is:

1. A target object rendition method, applied to an electronic device comprising a camera, a display screen, one or more processors and memory storing a plurality of programs to be executed by the one or more processors, the method comprising:
    photographing an entity card by using the camera, wherein the entity card includes multiple target objects including a first target object printed on the entity card, each target object corresponding to a respective virtual character of a computer game;
    obtaining a first piece of image interpretation data of the first target object of the multiple target objects, the first piece of the image interpretation data including information to reflect a feature of the first target object;
    comparing the first piece of the image interpretation data with each piece of prestored image interpretation data to identify a respective piece of the prestored image interpretation data with highest similarity to the first piece of the image interpretation data;
    obtaining a first prestored target object corresponding to the respective piece of the prestored image interpretation data by:
        matching image interpretation data of a respective prestored target object of the multiple target objects with the respective piece of the prestored image interpretation data;
        determining whether the respective prestored target object whose corresponding image interpretation data match the respective piece of the prestored image interpretation data has been reserved by another electronic device; and
        repeating said matching and determining steps until obtaining a prestored target object that has not reserved by another electronic device as the first prestored target object;
    invoking the computer game associated with the first prestored target object; and
    rendering, using the computer game, the first prestored target object on the display screen along with a real-time actual background photograph continuously captured by the camera.

2. The method according to claim 1, wherein the first prestored target object is a virtual two-dimensional model or a virtual three-dimensional model.

3. An electronic device comprising a camera, a display screen, one or more processors, memory, and a plurality of programs stored in the memory that, when executed by the one or more processors, cause the electronic device to perform the following operations:
    photographing an entity card by using the camera, wherein the entity card includes multiple target objects including a first target object printed on the entity card, each target object corresponding to a respective virtual character of a computer game;
    obtaining a first piece of image interpretation data of the first target object of the multiple target objects, the first piece of the image interpretation data including information to reflect a feature of the first target object;
    comparing the first piece of the image interpretation data with each piece of prestored image interpretation data to identify a respective piece of the prestored image interpretation data with highest similarity to the first piece of the image interpretation data;
    obtaining a first prestored target object corresponding to the respective piece of the prestored image interpretation data by:
        matching image interpretation data of a respective prestored target object of the multiple target objects with the respective piece of the prestored image interpretation data;
        determining whether the respective prestored target object whose corresponding image interpretation data match the respective piece of the prestored image interpretation data has been reserved by another electronic device; and
        repeating said matching and determining steps until obtaining a prestored target object that has not reserved by another electronic device as the first prestored target object;
    invoking the computer game associated with the first prestored target object; and
    rendering, using the computer game, the first prestored target object on the display screen along with a real-time actual background photograph continuously captured by the camera.

4. A non-transitory computer readable storage medium storing a plurality of programs that, when executed by an electronic device having a camera and a display screen, cause the electronic device to perform the following operations:
    photographing an entity card by using the camera, wherein the entity card includes multiple target objects including a first target object printed on the entity card, each target object corresponding to a respective virtual character of a computer game;

obtaining a first piece of image interpretation data of the first target object of the multiple target objects, the first piece of the image interpretation data including information to reflect a feature of the first target object;

comparing the first piece of the image interpretation data with each piece of prestored image interpretation data to identify a respective piece of the prestored image interpretation data with highest similarity to the first piece of the image interpretation data;

obtaining a first prestored target object corresponding to the respective piece of the prestored image interpretation data by:

matching image interpretation data of a respective prestored target object of the multiple target objects with the respective piece of the prestored image interpretation data;

determining whether the respective prestored target object whose corresponding image interpretation data match the respective piece of the prestored image interpretation data has been reserved by another electronic device; and     repeating said matching and determining steps until obtaining a prestored target object that has not reserved by another electronic device as the first prestored target object;

invoking the computer game associated with the first prestored target object; and rendering, using the computer game, the first prestored target object on the display screen along with a real-time actual background photograph continuously captured by the camera.

\* \* \* \* \*